(12) United States Patent
Kenney et al.

(10) Patent No.: US 8,991,267 B1
(45) Date of Patent: Mar. 31, 2015

(54) ENGINE TORQUE SENSOR

(71) Applicant: Continental Motors, Inc., Mobile, AL (US)

(72) Inventors: Timothy Miles Kenney, Daphne, AL (US); Hussam El-Jobran, Daphne, AL (US); Timothy C. Owen, Fairhope, AL (US)

(73) Assignee: Continental Motors, Inc., Mobile, AL (US)

( * ) Notice: Subject to any disclaimer, the term of this patent is extended or adjusted under 35 U.S.C. 154(b) by 6 days.

(21) Appl. No.: 13/826,420

(22) Filed: Mar. 14, 2013

(51) Int. Cl.
*G01L 1/22* (2006.01)
*G01L 3/00* (2006.01)
*G01L 3/10* (2006.01)

(52) U.S. Cl.
CPC .. *G01L 3/10* (2013.01); *G01L 3/108* (2013.01)
USPC .................................................... 73/862.338

(58) Field of Classification Search
USPC .................................................... 73/862.338
See application file for complete search history.

(56) References Cited

U.S. PATENT DOCUMENTS

| 5,514,952 A | * | 5/1996 | Parkinson | 324/207.25 |
| 8,161,828 B1 | * | 4/2012 | Clegg et al. | 73/862.338 |
| 2007/0030134 A1 | * | 2/2007 | Liu et al. | 340/441 |
| 2011/0041625 A1 | * | 2/2011 | Meuter | 73/862.338 |

OTHER PUBLICATIONS http://www.sensorland.com/HowPage002.html; pp. 1-6, Aug. 22, 2013.

* cited by examiner

*Primary Examiner* — Lisa Caputo
*Assistant Examiner* — Jamel Williams
(74) *Attorney, Agent, or Firm* — Taylor English Duma, LLP

(57) ABSTRACT

A system and method of measuring engine torque by interposing a hub 20 between a power source/engine and a driven device such as a propeller 24. The hub 20 is preferably made unitary of a single material and includes a strain gauge 48/49 to measure twisting forces. The gauge output is transmitted 44 to a receiver not part of any rotating component. A housing 50 shields the gauge but is rigidly connected to only one part of the hub and thus does not impact the strain gauge measurement.

15 Claims, 5 Drawing Sheets

ENGINE TORQUE SENSOR

CROSS-REFERENCE TO RELATED APPLICATION

Not Applicable

BACKGROUND OF THE INVENTION

1. Field of the Disclosure

The present disclosure is directed to tools for measurement of engine torque.

2. Description of the Related Art

Determination of entire torque is an important element of engine performance, but it is an essential element in some circumstances, particularly propeller aircraft engines.

In many countries including the USA, aviation authorities such as the FAA require that an aircraft engine be dynamically tested for engine torque over a range of speeds to insure that the aircraft engine is suitable for the airframe.

Dynamic testing, i.e. with the motor in the airframe and the propeller attached, is necessary to be run when the aircraft is in flight. Such dynamic testing by prior art systems has been difficult and dangerous.

There are also other problems with prior art approaches. They require a signal cable. The transmission of the signal from the torque sensor to the aircraft instrumentation must be achieved via a multi-conductor signal cable. Because the cable is in relatively close proximity to the rotation of the propeller and starter ring gear, there is a risk that the cable will be caught up in the propeller. Heat, vibration and chafing reduce cable life, as well.

The prior art systems are also heavy due to the added weight of the slip-ring housing and associated bearings. This is a problem when flight testing aircraft that are close to the front of the weight and balance envelope. The sensor moves too much weight too far forward. At times, this condition will require a test flight be conducted without a flight engineer, to reduce weight. This requires the pilot to not only fly the aircraft, but monitor the data acquisition equipment as well. If the bearings were to seize, the entire assembly might be destroyed, not to mention damage to the engine, propeller and hazard to the crew.

Prior art devices are not strong enough. The torque sensing element must be of a two piece design to facilitate assembly through the outer slip ring housing. This junction of the torque sensing element is the limiting factor regarding the overall strength.

Prior art devices have bearings between the slip ring housing and the torque sensing element and are of constant concern. The bearings are heavy and difficult to replace. Typically the unit must be returned to the manufacturer for replacement. The average life of the slip ring housing bearing is less than 400 hours.

Prior art devices have brushes. The carbon brushes used for signal transmission are a regular source of maintenance. The normal brush wear deposits carbon dust inside the brush housing requiring constant cleaning. The brushes also frequently become lodged in the housing causing signal degradation.

Clearly this is not an effective solution, but because of FAA requirements, aircraft engine manufacturers and rebuilders have been forced to use it.

The present disclosure addresses both of these problems with an innovative solution.

BRIEF SUMMARY OF THE INVENTION

The following summary is intended to assist the reader in understanding the full disclosure and the claims. The claims, not this summary, define the scope of the invention.

The present disclosure relates to an engine torque measuring system which interposes a hub between the engine output shaft and the driven element (a propeller in an aircraft) with a pair of flanges boltable to the output shaft and driven element with a cylindrical shaft therebetween. The hub includes a pair of integral flanges boltable to the output shaft and driven element with a cylindrical shaft therebetween, and a cylindrical hub core. The hub core includes a torsion sensor, typically a strain gauge sensor that is either resistive or generates a millivolt output or a piezo-electric element affixed to the core. A collar may be clamped/bolted around the core and contains a wireless transmitter connected to the element through an interface and a power source and antenna. Signals coming from the element are transmitted thru the interface to a stationary wireless receiver nearby.

The disclosure further includes an interposing hub made of a single unitary material so that torsional forces applied between the flanges are accurately transferred as twisting in the core and thus accurately detected by the element.

The disclosure further includes temperature compensation measurement of the hub to account for expansion and contraction thereof during test.

The disclosure further includes affixing the element to the core by adhesive.

The disclosure further includes an RFID in place of the transmitter, the RFID emitting a code which is changes according to the output of the element, and a stationary RF source to excite said RFID to at periodic intervals and thus produce periodic data reports from the element and eliminate the need for a power source which must rotate with the hub.

DETAILED DESCRIPTION OF THE DISCLOSURE

Figure 1:
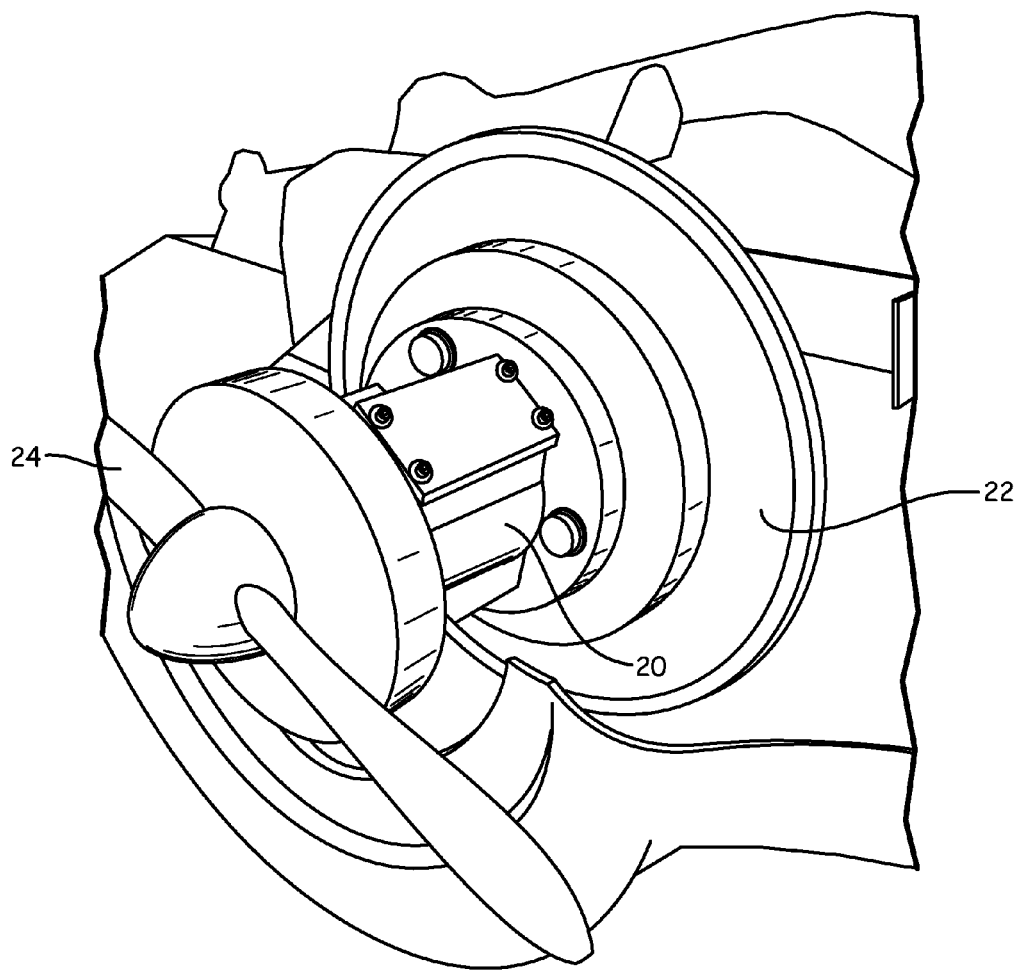
FIG. 1 is a perspective view of an engine, hub and propeller.

The present disclosure provides a system and method of dynamically measuring torque, in situ, between an engine and a driven element. The preferred embodiment for this disclosure is an aircraft with a propeller, and the remaining disclosure will refer to that embodiment, but it should be understood that this disclosure and claimed invention can be applied to other motor/engine devices driving other elements.

As mentioned above, it is critically important to know the maximum, peak and average torque between a propeller and engine in order that the aircraft be safe for flight and within tolerances. The only practical way to do this is in actual flight and not in a controlled static environment.

To take such a measurement, an interposing hub 20 is connected typically by bolts, to an engine 22, such as at its flywheel and at the other end, to a propeller (prop) 24 attached at the distal end of hub 20.

Hub 20 includes a proximal flange 30, a distal flange 32 and a central core 34 which may be hollow or solid. It is preferably a cylinder but may also have a polygon or oval or other cross section. Flanges are to be interpreted broadly to be any form of connection between the drive and driven device according to the way the system is constructed. They do not need to be flat or disk-shaped as shown.

In the preferred embodiment, hub 20 is machined or formed from a single piece of stock, i.e. it is a unitary single piece construction. This provides the most accurate torque readings because forces are not dissipated in joints. It is also possible to have a multi-piece hub with or without removable flanges (not required) but the joints should be rigid/non-slipping with respect to each other and the core; otherwise, the torque measurement will be degraded. So, for example, flanges which are either formed integral, i.e. formed as part of a single element or from a unitary block or web, or, optionally welded to the core are possible but the most accurate measurements will be obtained with a hub which is formed/stamped/machined from a single block of material, preferably steel, aluminum, titanium, etc. The material should be as rigid as possible without fracturing.

Each flange includes apertures 40 to mate with standard mating apertures on the engine and prop ends.

Figure 4:
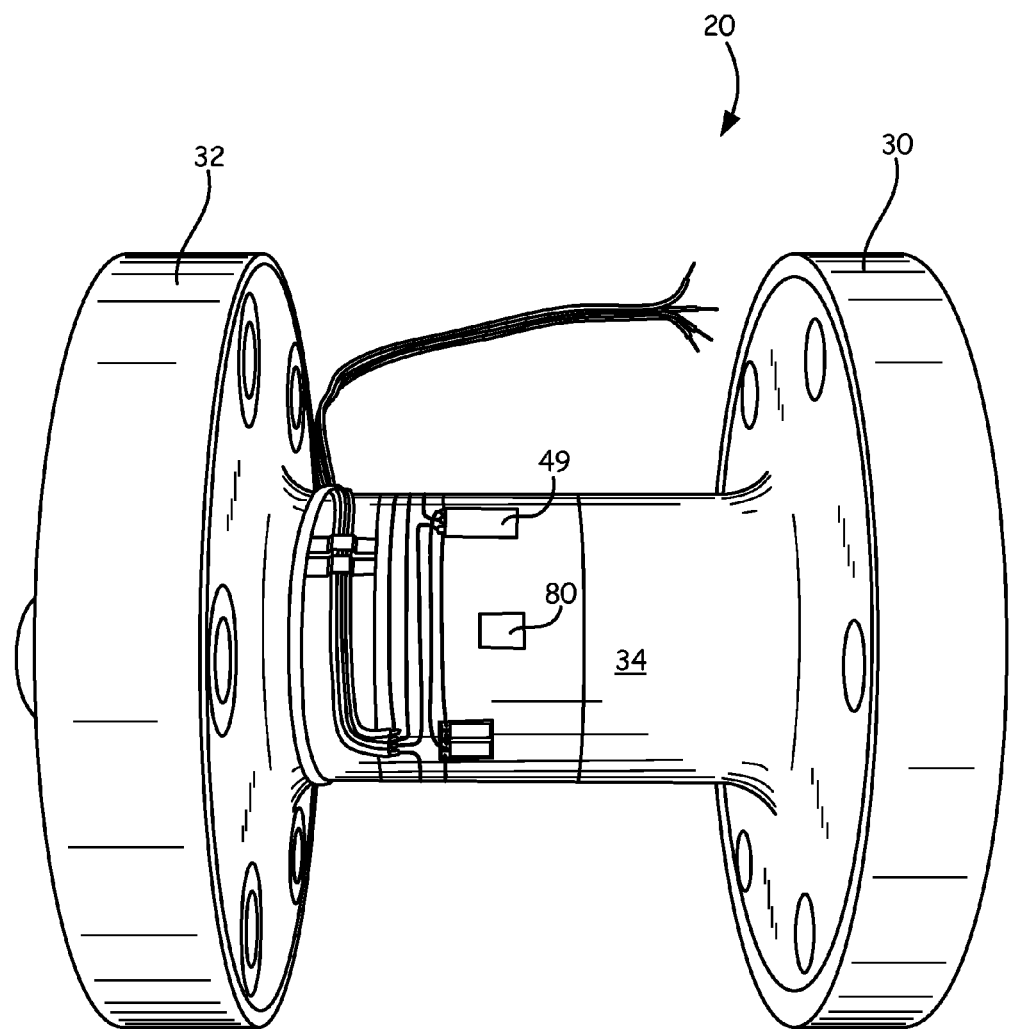
FIG. 4 is a top plan view of the hub with housing removed.
Figure 5:
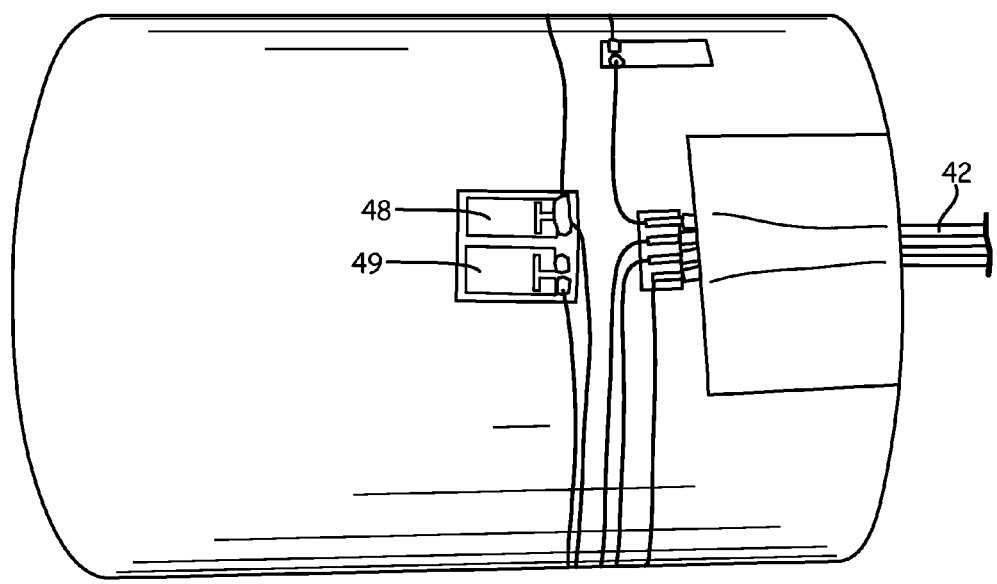
FIG. 5 is a top plan view of the hub with flanges broken away showing the sensors.

FIG. 4 shows the placement of the strain gauge—resistive or millivolt—or alternatively, piezo-electric sensors 48/49 on core 34. Its preferred location is adjacent one of the flanges but on the portion of the core which is of uniform diameter so that there is a linearly curved area of attachment. If the core is polygonal, then the preferred location is adjacent one of the flanges on a planar region. The sensor can be connected into a Wheatstone bridge circuit of a type know in the art. An example circuit is found at www.sensorland.com under "Strain Gauge" or http://www.sensorland.com/HowPage002.html, which is incorporated herein by reference.

Figure 2:
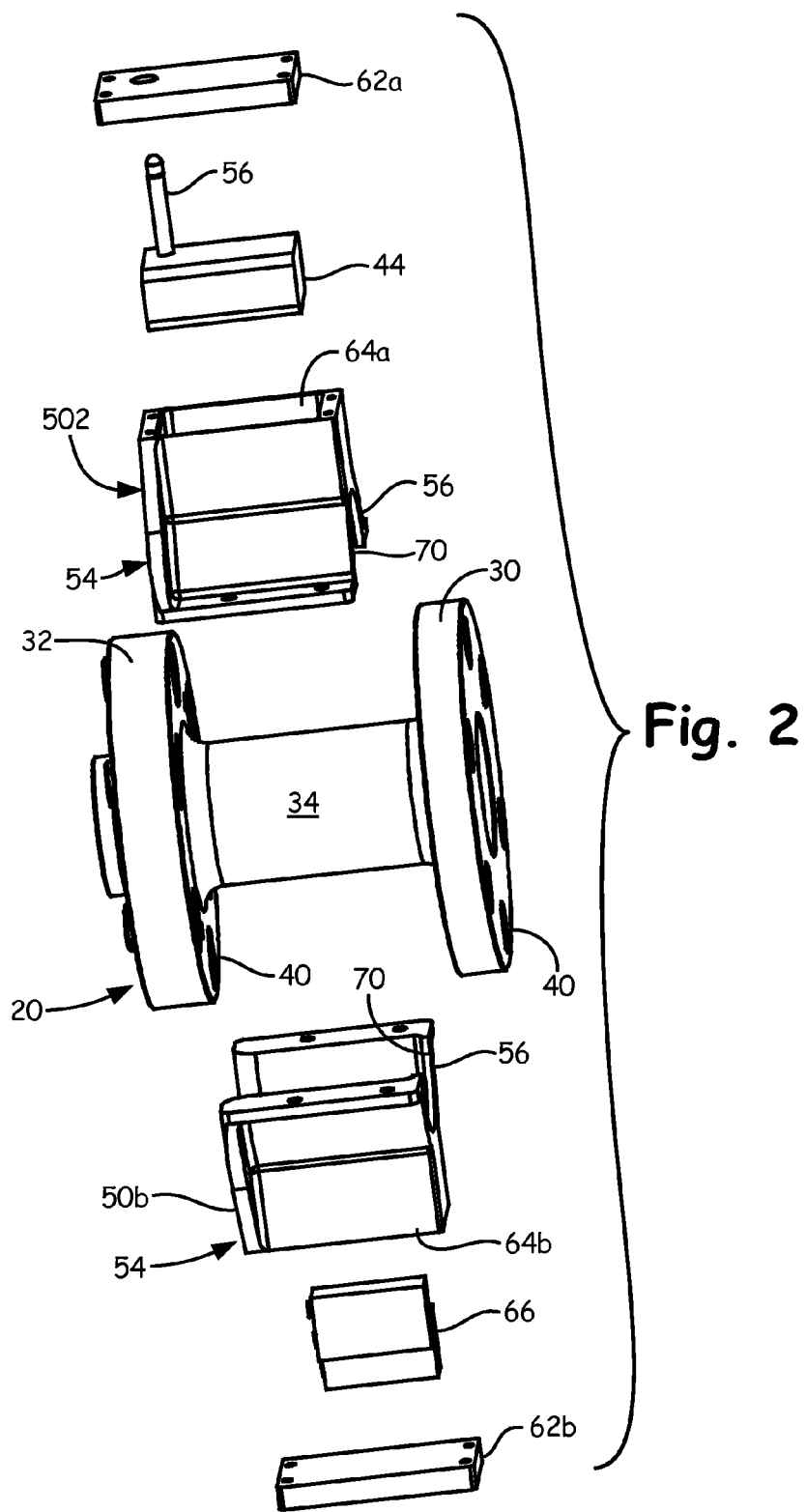
FIG. 2 is an exploded view of the hub assembly with housing.
Figure 3:
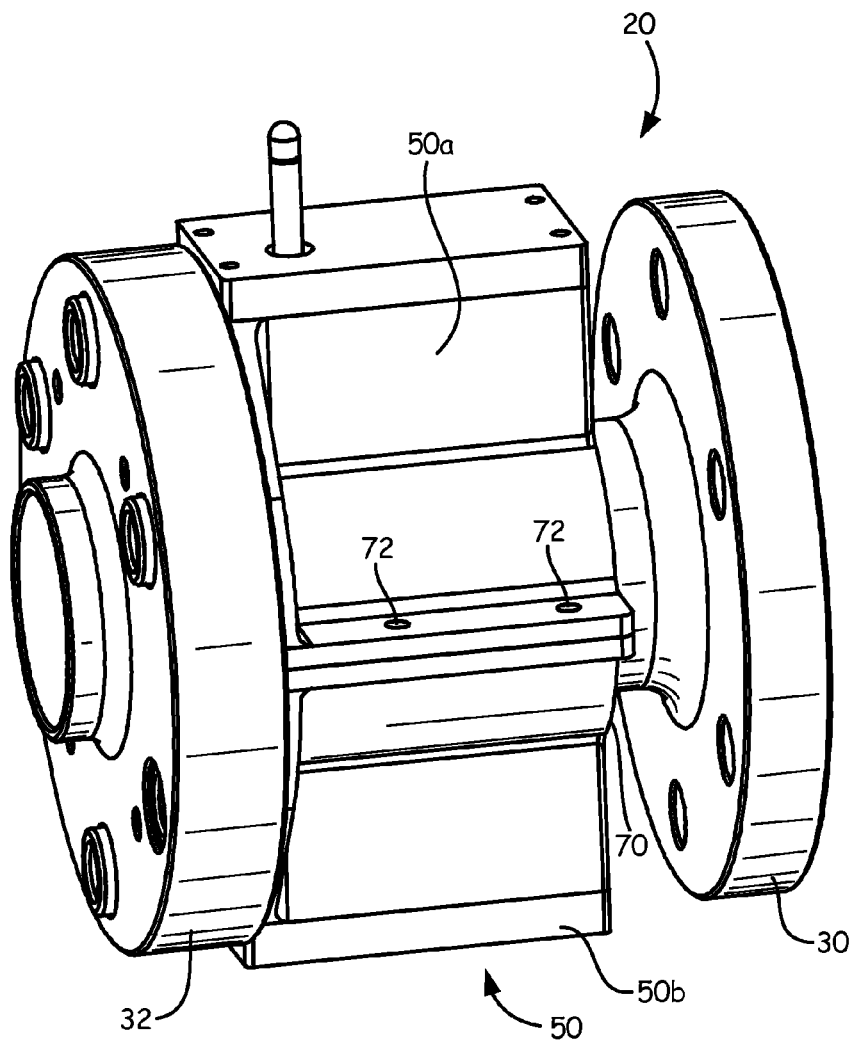
FIG. 3 is a perspective view of an assembled hub and housing.

The sensor is of a known type which measures strain across its surface. An example strain gauge is available from Vishay Precision Group, of Raleigh, N.C., USA. The gauge is supplied in a flexible mylar form and is then affixed to the core by adhesive such an epoxy. In the preferred embodiment, multiple sensors are affixed onto the core at various locations. They can be wired 42 to an interface to output an average torque, individual torques, or in case of a gauge failure, to provide a backup. A Wheatstone bridge of known type is the preferred electrical connection to the interface 44 (FIG. 2). It is also possible to include a thermocouple or thermistor in the circuit.

To protect the core and provide a location for the interface and power supply (if needed), a collar/housing is supplied. Critical to the function of the strain/torque measurement is that the collar not interfere with the measurement. Thus, prior art housing connection which clamps to both flanges or the core will not work and may in fact cause the connecting bolts to fail.

Instead, the housing/collar assembly 50 (made of halves or half shells 50a-50b) can only be affixed to one flange or one portion of the core and be cantilevered therefrom. The housing cannot be rigidly affixed to both flanges, or two points on the core, or one flange and a point on the core. If those conditions were allowed, the strain gauges will likely give inaccurate readings as the housing will have skewed the twisting/shearing forces on the core.

To eliminate this skewing effect, the housing is preferably affixed to one flange at its proximal end 54 but at its distal end 56, it surrounds the core shaft 34 but does not touch it. Rather, a flexible sealant such as RTV can be applied in the gap. An O-ring or resilient packing can also be used, and in fact, the gap can be allowed to be unfilled, though there is risk of dirt and water contamination.

The housing/collar 50 provides protection for the strain gauge, a wireless transmitter module 44 or RFID antenna 56. The transmitter/interface receives the voltage/impedance outputs from the strain gauges 48/49 and transmits them to a receiver nearby on the aircraft (or any non-rotating part). The transmitter interface can be stored in recess 64a in collar part 50a and covered by plate 62a. The transmitter interfaces 44 may include an analog to digital (NO) converter and then transmit digital data to the receiver. If RFID technology is used, the receiver is a transceiver which pings the RFID chip and the energy of the ping will transmit a digital code corresponding to the strain/torque reading at the sensors. The interface periodically updates the code transmitted by the RFID to correspond to the strain gauge reading.

In the case of a powered transmitter, a power source module (f. ex battery 66) can be fitted into the other half of the collar 50b in a recess 64b provided and sealed with a cover plate 62b. In the preferred embodiment the half shells are then generally equally balanced to avoid introducing vibrations into the hub. The balance can be accomplished by adding or subtracting weights so that the shells are of equal weight.

A bead of resilient sealant 70 can be placed in the inner arcuate surface of each housing 50a/b in sufficient quantity that it closes the gap to the core. The housing hemispheres 50a/b can be joined and bolted together at apertures 72. Notice that housing collar 50 does not link the flanges so that the core is never constrained by the housing.

Because temperature can cause the strain gauges to stretch or compress, their output may vary as the engine heats up or other ambient temperature changes. These variations could be interpreted as changes in torque. Therefore, in the preferred embodiment, a temperature sensor 80 may be provided and wired back to the wireless interface. The data from this sensor will provide an offset value for the strain sensors based. The data can be collected by experimental data collection or by other means where known torque data is deliberately skewed by temperature changes and then the skew factor becomes the offset in the data table.

Also disclosed is a method of measuring engine torque including any or all of the following steps in any order:
- a. forming a unitary hub made of a pair of spaced apart flanges and a core connecting the flanges, the hub and flanges being rigidly formed so that they may not rotate with respect to each other. In the preferred embodiment, they are made from a single contiguous rigid material;
- b. interposing a hub between a power source (engine/motor) and a driven device (f. ex propeller) with one flange rigidly connected to the source and the other to the driven device;
- c. measuring the twisting strain on the core resulting from torque forces between the flanges;
- d. transmitting the strain measurements wirelessly to a receiver;
- e. locating a receiver apart from the hub so that it does not rotate with the hub and has no wired connection therewith;
- f. converting strain gauge measurement received at the receiver into torque measurements;
- g. compensating for effect of temperature change on the hub by measuring the temperature of the hub and offsetting the torque measurement to normalize temperature variations;

h. covering the core with a housing which does not rigidly connect to the both flanges or one flange and the core to avoid introducing an error in the strain measurement.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

The invention claimed is:

1. An engine torque measuring device for use with an engine output shaft and a driven element, comprising:
    a hub interposed between the engine output shaft and the driven element, said hub including a pair of spaced-apart flanges connectable to said shaft and said element with a core therebetween;
    said hub being unitarily formed as a single unit;
    a torsion sensor affixed to said hub;
    a housing collar located generally located over said core and being attached to one of said flanges and cantilevered over at least a part of said core, said housing collar including a pair of half shells, one of the half shells including a recess for the transmitter interface;
    a wireless transmitter interface connected to said sensor to transmit output from said sensor to a remote receiver; whereby sensor signals measuring twisting of the core corresponding to torque measurements are periodically transmitted to the receiver.

2. The device of claim 1, wherein the sensor is a strain gauge and where said gauge is rigidly affixed to said core to measure twisting of the core in correlation with torque between the shaft and the element.

3. The device of claim 1, wherein said hub is made of a single material machined to form flanges and a core.

4. The device of claim 1, wherein said hub includes a pair of integral flanges extending from said core so that the flanges cannot be removed.

5. The device of claim 1, wherein said hub is made of a pair of flanges rigidly and non-rotatably connected to said core.

6. The device of claim 1, wherein said housing collar is formed of a first half shell and a second half shell and wherein at least one of said half shells is connected to only one of said flanges.

7. The device of claim 1, wherein said sensor includes a plurality of sensors configured to provide an average torque measurement.

8. The device of claim 1, wherein said sensor includes a plurality of sensors configured to provide a highest torque measurement and a lowest torque measurement.

9. The device of claim 1, further including a temperature sensor located on said core, and wherein said temperature sensor provides data to compensate for temperature variations in torque measurements caused by expansion and contraction of the core in response to temperature changes.

10. The device of claim 1, wherein said housing does not bridge said pair of flanges, such that torsional movement of one flange with respect to the other flange is unaffected by said housing.

11. The device of claim 1, wherein the other half shell of a pair of half shells includes a recess for a power supply for the interface, and wherein said half shells are generally equally balanced.

12. The device of claim 1, wherein said transmitter includes an RFID device and wherein said sensor provides data to the RFID device thereby periodically changing the output code of the RFID device.

13. An engine torque measuring device for use with an engine output shaft and a driven element, comprising:
    a hub interposed between the engine output shaft and the driven element, said hub including a pair of spaced-apart flanges connectable to said shaft and element with a core therebetween;
    a torsion sensor affixed to said hub;
    a housing collar located generally located over said core and being attached to one of said flanges and cantilevered over at least a part of said core, said housing collar including a pair of half shells, one of the half shells including a recess for the transmitter interface;
    a wireless transmitter interface connected to said sensor to transmit output from said sensor to a remote receiver; whereby sensor signals measuring twisting of the core corresponding to torque measurements are periodically transmitted to the receiver.

14. A method of measuring engine torque between a drive motor and a driven element, comprising the steps of
    interposing a device including a hub and a housing collar between the drive motor and the driven element; the hub including a pair of spaced-apart flanges and a core between the flanges, the core and the flanges being rigidly formed so that they are not allowed to rotate with respect to each other; the housing collar located generally located over said core and being attached to one of said pair of flanges and spaced apart from the other of said pair of flanges cantilevered over at least a part of said core, said housing collar including a pair of half shells, one of the half shells including a recess for the transmitter interface;
    connecting one flange rigidly to the motor and the other flange rigidly to the driven element;
    measuring the twisting strain on the core resulting from torque forces between the flanges, yielding strain measurements;
    transmitting the strain measurements wirelessly to a receiver;
    locating a receiver apart from the hub so that it does not rotate with the hub and has no wired connection therewith;
    converting strain measurements received by the receiver into torque measurements; and
    compensating for an effect of temperature change on the hub by measuring the temperature of the hub and offsetting the torque measurement to normalize temperature variations.

15. The method of claim 14, wherein the housing collar is rigidly connected to only one of the pair of flanges to avoid introducing an error into the strain measurements.

* * * * *